United States Patent
Tohma et al.

[15] 3,696,622
[45] Oct. 10, 1972

[54] A METHOD OF SOIL STABILIZATION AND LEAKAGE PREVENTION

[72] Inventors: Wataru Tohma, Yamato-Takada; Takao Murata, Yaizu; Nobutaka Nakamura, Fujieda; Atsushi Kudo, Tokyo, all of Japan

[73] Assignees: Sumitomo Durez Company, Limited, Tokyo; Sumitomo Chemical Company, Limited, Osaka, Japan

[22] Filed: Feb. 17, 1971

[21] Appl. No.: 116,207

[52] U.S. Cl..................61/36 R, 166/295, 260/17.5, 260/29.3, 260/59
[51] Int. Cl...........................E02d 3/12, E21b 33/13
[58] Field of Search.......61/36 R; 166/295; 260/17.5, 260/29.3, 59

[56] References Cited

UNITED STATES PATENTS

| | | |
|---|---|---|
| 2,513,614 | 7/1950 | Barkhuff, Jr................166/295 |
| 2,595,184 | 4/1952 | Wrightsman...............61/36 R |
| 3,305,017 | 2/1967 | Dollarhide.................166/295 |
| 3,332,245 | 7/1967 | Caron........................61/36 R |
| 3,391,542 | 7/1968 | Herrick et al..............61/36 R |
| 3,495,412 | 2/1970 | Sakata et al...............61/36 R |
| 3,599,433 | 8/1971 | Murata......................61/36 R |

Primary Examiner—Stephen J. Novosad
Attorney—Peter F. Casella, Donald C. Studley, Richard P. Mueller and James F. Mudd

[57] ABSTRACT

An improved method of soil stabilization and leakage prevention characterized by using a resin composition which comprises a water soluble strongly alkaline liquid phenol formaldehyde resin with a pH of 9.5 or more and having a molar ratio of phenol to formaldehyde between 1:1.5 and 1:3.0, and a lactone which is added in a proportion of 1 to 30 percent of the liquid resin, in which a compound such as urea, a urea derivative, a basic or neutral salt is used as a gelation control agent.

6 Claims, No Drawings

METHOD OF SOIL STABILIZATION AND LEAKAGE PREVENTION

CROSS-REFERENCES TO RELATED APPLICATIONS

This invention is an improvement over the invention of copending application Ser. No. 746,530, filed July 22, 1968, now U. S. Pat. No. 3,599,433, the disclosure of which is incorporated herein by reference.

DESCRIPTION OF PREFERRED EMBODIMENTS

The present invention relates to the method of soil stabilization and leakage prevention by means of a so-called "chemical grout" using synthetic resin compositions which comprise a strong alkaline phenol formaldehyde resin liquid, $\gamma$- or $\delta$-lactone compounds as a hardening agent, and urea, urea derivatives, acetonitrile, water soluble weak acid-strong base salts or strong acid-strong base salts as a suitable gelation time control agent, for example, by filling crevices and cracks of the rock-bed, construction joints of a concrete dam, voids of gravel, etc. with the said resin composition for the prevention of leakage, and grouting with said resin composition soft ground for solidification, or grouting the wall of a petroleum well for prevention of crumbling and other applications for prevention of seepage of ground water which occurs frequently in various civil engineering works.

More particularly, the present invention relates to a method of soil stabilization and leakage or seepage prevention whereby a resin composition comprising 100 parts by weight of a water soluble strong alkaline liquid phenol formaldehyde resin having a molar ratio of phenol to formaldehyde between 1 : 1.5 and 1 : 3.0 which pH is 9.5 or more, or a water soluble strong alkaline liquid modified phenol formaldehyde resin replacing a part of phenol of the composition described herein, with one or several compounds selected from urea, melamine, dicyandiamide, lignin, cresols, cathecol, resorcinol, guanamines and so on, and adding one part or more by weight of lactones such as $\gamma$- or $\delta$-lactone and so on which act as a hardening agent, and moreover adding an adequate amount of urea, urea derivative, acetonitrile or other water soluble weak acid-strong base salts or strong acid-strong base salts which act as a suitable gelation time control agent to the said mixture. When crevices and cracks of the rock-bed, construction joints of concrete dam, or voids of sand layer, soft ground or wall of petroleum well, etc. are grouted with the aforesaid mixture, then it hardens at normal temperature within the required time not only in the voids of the soil or sand grains, but also in the presence of water or oil.

Usually, for such kind of soil stabilization and leakage or seepage prevention, aqueous cement suspension, water glass (Sodium Silicate), mixed liquid of cement and water glass, etc., are used, which handling and grouting are simple and performance is excellent for leakage prevention of hard ground having a wide gap such as a crack in rock-bed or for the reinforcement of bearing power of the ground; however, when it comes to a gap narrower than 0.1 millimeter, it is difficult to grout the crack. Also these conventional methods are unfit for use in those instances where it is necessary to harden the grouted liquid rapidly, as it usually takes several hours for hardening.

However, as water glass is comparatively easy in adjusting its hardening time by changing its hardening agents, and is also characterized by imparting higher strength to the ground after hardening of the grouted liquid, it is used sometimes by customers who are in need of rapid cure and high strength. But as its viscosity, being in the range of 40 to 60 centipoises, is comparatively high as grouting liquid, it is difficult to grout a narrow gap as described above.

On the one hand, "Chrone-lignin" is a commercial grouting liquid, prepared by mixing pulp waste liquor with bichromates as its main raw materials; during the early period following its preparation, it has good percolating properties for fine openings second to acrylamide described below. But, it has a few faults, that is the gradual rise in viscosity of the prepared liquid, the need of scores of minutes and/or several hours for finishing the hardening process, and even then the ground has relatively weak strength after hardening, and so forth.

Acrylamide and urea resins are being used most widely at present as liquid chemical grouting agents. Hardening of acrylamide takes place almost instantaneously after a definite time by following preparation of the liquid and its viscosity prior to the start of hardening is 1.2 centipoise which is approximately the same as that of water, so it has a characteristic of being able to percolate minute cracks, and it is one of the excellent chemical grouting agents, but it has a disadvantage of being more expensive. In contrast, urea resin is at a low price and also has a higher strength than that of acrylamide, but a gel formed by urea resin is hydrophobic and its coefficient of permeability in the soil is much smaller than that of acrylamide, and moreover as a strong acid is used as a hardening agent, so it comes into question by causing corrosion on the metallic parts of grouting machine etc.. Still more, urea resin isolates formaldehyde readily on the occasion of hardening, which irritating odor is much of a nuisance in practice. And also it has a fault of showing a rapid rise in viscosity within the short time of the grouting operation.

There are some inventions which are already patented, claiming the use of liquid phenol formaldehyde resin as a chemical grouting agent. For example, U. S. Pat. No. 2,485,527 states that a phenol formaldehyde resin liquid is prepared from reacting alkaline phenol and formalin and then neutralizing, followed by partial reaction with resorcinol. For actual application of the said reaction product, it is hardened by use of an aqueous sodium hydroxide solution. The disadvantage of this resin lies in its need of a large amount of expensive resorcinol, so it is considered that feasibility of practical use of this resin in Japan is unlikely for some time to come. Morevoer, this resin is difficult to harden in presence of oil and/or common salts. And also, it has a disadvantage of being temperature-sensitive which causes much delay in hardening at temperature from 5° to 10° C., and so forth.

The present invention is a method of soil stabilization and leakage or seepage prevention characterized by a strong alkaline liquid phenol formaldehyde resin which overcomes those defects described hereinbefore and is comparatively low-priced, which is blended with $\gamma$- or $\delta$-lactone compounds and then with the addition of a suitable gelation time control agent such as urea, urea derivatives, acetonitrile, water-soluble weak acid-strong base salts, or strong acid-strong base salts, and the required soil is grouted with the mixture which hardens therein. The inventors have found the usefulness of the water soluble strong alkaline liquid phenol formaldehyde resin which cures in soil when admixed with lactones even in the presence of a large amount of water, so that prevention of leakage is secured by its ability to fill crevices or cracks of rock-bed, or construction joints of a concrete dam, voids of gravel(layer), and other emergency applications for leak prevention of ground water which occur frequently during various civil engineering works, also easy permeation of soft ground by the resin adds reinforcement to it or prevents collapse of the wall of petroleum well. And moreover, the inventors have found a method for controlling the gelation time at will using such a water soluble phenol formaldehyde resin admixed with $\gamma$- and/or $\delta$-lactone.

The liquid phenol formaldehyde resin which can be used in this invention has a molar ratio of phenol to formaldehyde between 1 : 1.5 and 1 : 3.0 and is soluble in strong alkaline water with a pH of 9.5 or more. Hereupon, in case of a molar ratio of phenol to formaldehyde less than 1 : 1.5, insufficient or no gelation occurs with the liquid phenol formaldehyde resin by increasing or decreasing the admixing amount of lactones, regardless of the pH of the liquid resin. And even in the case of a resin with a molar ratio of phenol to formaldehyde more than 1 : 1.5, when the pH is less than 9.5, it is necessary to increase the amount of lactones much more than that in the aforementioned case, or to increase the temperature in order to induce gelation.

In realizing the present invention, in order to make a strong alkaline liquid phenol formaldehyde resin, higher than 9.5 in pH value, it is preferable to use caustic soda, although caustic potash, barium hydroxide etc. show substantially the same effect as caustic soda.

And by replacing a part of phenol, which is the main composition of the strong alkaline liquid phenol formaldehyde resin described herein, with one or several compounds selected from urea, melamine, dicyandiamide, lignin, cresols, catechol, resorcinol, guanamines and so forth, the same effect as the original resin can be obtained substantially with such modified resin.

The lactone compounds, preferable as hardening agent of the present invention, include $\gamma$-butyrolactone, $\gamma$-valerolactone, $\delta$-valerolactone, $\gamma$-coumarin, $\delta$-coumarin and the alkyl derivatives of these lactones. Each one shows a remarkable effect as a hardening agent. The required quantity of these lactones to be added to the strong alkaline liquid phenol formaldehyde resin, is usually between 4 and 15 percent by weight of the resin, and if the added amount is less than 1(one) percent, no gelation takes place at room temperature. Moreover, when there is a large amount of water in the grouting liquid, it is necessary to increase the quantity of lactone added, but the exact amount should be also regulated in accordance with difference in composition of the strong alkaline liquid phenol formaldehyde resin. However, in case of a request for high soil strength particularly, more than 30 percent of lactone is added to the liquid phenol formaldehyde resin whereby high soil strength is obtained even in the presence of any other substance; but it should be noted that the viscosity of the mixture will become high as a grouting liquid.

The inventors have found the usefulness of urea, urea derivatives, acetonitrile, and such water soluble weak acid-strong base salts or strong acid-strong base salts as sodium succinate, sodium tartrate, sodium acetate, sodium carbonate, potassium carbonate, sodium chloride, potassium chloride and so forth, which act as a gelation time controlling agent. Urea, urea derivatives and acetonitrile have a delaying effect on gelation, and water soluble weak acid-strong base salts and strong acid-strong base salts have an accelerating effect on gelation. And also, for actual application, two or more of these agents can be combined in a suitable proportion as gelation time controlling agents. The gelation time based on the present invention can be controlled at will between 2 minutes and about 2 hours with suitable selection or blending of those gelation time controlling agents.

To sum up the excellent characteristics of the method of soil stabilization and leakage prevention according to the present invention, they are as follows:

1. It hardens within an optional required time even in the presence of water, oil, inorganic salts contained in sea water and moreover sulfides, etc. respectively in any proportion, and imparts a strong bonding strength to rock-beds or soil sand grains.

2. The grouting liquid maintains a viscosity lower than 3(three) centipoises until start of its hardening (or gelation), so it percolates very small openings, and also it hardens under lower temperature, somewhere below 5° C., and moreover, the hardened matter becomes insoluble in water and its property is stable for several years. And for obtaining higher soil strength a grouting liquid having a viscosity of 50 to 100 centipoises is used generally.

3. It hardens even in acidic or alkaline soil, and the resulting soil compressive strength after hardening of the grouting liquid increases to more than 10 kg/cm$^2$.

4. Hardening proceeds rapidly from a state of low viscosity to a gelled form, similar to addition polymerization of resin monomers. Moreover, the resulting hardened substance retains its hydrophilic property.

5. The process of grouting is simple and does not require any special machine or equipment. Moreover, the grouting liquid is alkaline, so there is no chance of causing corrosion of the grouting machine, in contrast to the case of grouts using urea resin.

6. In comparison with urea resin grouting, there is no generation of formalin odor, so grouting can be done in a much better environment.

Following examples are shown to explain the effectiveness of the present invention concretely, but it does not limit the scope of this invention.

EXAMPLE 1

1,000 grams of phenol was charged into a five(5)-liter flask with 1,700 grams of formalin (37 percent formaldehyde aqueous solution) and 300 grams of aqueous sodium hydroxide solution (30 percent caustic soda), and reacted 40 minutes at 98° to 100° C. The end point of the reaction was decided by the viscosity of the reacted liquid of this phenol formaldehyde resin at 25° C. The properties of the resulting liquid resin were usually as follows:

| | |
|---|---|
| Appearance: | clear brown liquid |
| Specific Gravity(at 25°C): | 1.190 – 1.192 |
| Viscosity(at 25°C): | 3.0 – 3.3 poises |
| Gelation Time(at 130°C): | 20 – 22 minutes |
| Solid Content: | 48 – 49 percent |
| pH: | 10.5 – 10.8 |
| Water Tolerance: | infinite |

When a solution of 5cc γ-butyrolactone in 50cc of water, as hardening agent was admixed with the strong alkaline liquid phenol formaldehyde resin, it gelled after 25 minutes at room temperature.

On the other hand, in the case of adding 10 grams of sodium acetate into the above described water beforehand, its gelation time at room temperature was 4 minutes. Whereupon, 10 grams of urea was added instead of sodium acetate, the gelation time was retarded to 60 minutes.

All the grouting liquids formulated herein had a viscosity of 2 centipoises, so they percolated easily the minute openings of a sand layer and hardened thereon. The resulting soil strength after hardening was 10kg/cm$^2$ in the case of "Toyoura" standard grain sand. The coefficient of permeability on the same test specimen was $1.05 \times 10^{-7}$ cm/sec, but with a test specimen prepared by the quite same process using urea resin grouting liquid, its coefficient of water permeability was $3.26 \times 10^{-3}$ cm/sec. Furthermore, compressive strengths measured by uniaxial test after 3 hours and 24 hours standing of the original test specimens respectively, were as follows:

| Size of test specimen | 40 φ × 80 mm | |
|---|---|---|
| Compressive velocity | 1 mm/min. | |
| Aging | Strain | Stress |
| After 3 hours | 0.3% | 8.5kg/cm$^2$ |
| After 24 hours | 0.1 | 10.0 |

The results described above, clearly indicates that the resin composition is well sufficient and effective for soil stabilization and leakage prevention.

EXAMPLE 2

200 grams of urea and 700 grams of formalin (37 percent aqueous formaldehyde solution) were charged into a 5-liter flask and reacted 2 hours at 80° C., then 800 grams of phenol and 3 (three)cc. of hydrochloric acid were added, and further reacted for 30 minutes at 98° – 100° C.; then 500 grams of aqueous caustic soda solution (30 percent of sodium hydroxide) and 1,000 grams of formalin was added and reacted 2 hours at reflux. Eventually a strong alkaline urea modified phenol formaldehyde resin was obtained. The properties of the resulting resin liquid were as follows:

| | |
|---|---|
| Appearance: | clear brown liquid |
| Specific Gravity(at 25°C): | 1.95 – 1.96 |
| Viscosity(at 25°C): | 3.4 – 3.6 poises |
| Gelation Time(at 130°C): | 25 – 26 minutes |
| Solid Content: | 47 – 48 percent |
| Water Tolerance: | infinite |

When more than one percent by weight of δ-valerolactone as a hardening agent was added to the strong alkaline liquid urea modified phenol formaldehyde resin obtained hereby, it gelled rapidly at room temperature.

And also, the gelation time which was measured by blending formula described in Example 1, was 30 minutes without the addition of a gelation time controlling agent, but it become 5 minutes in case of adding 10 grams of sodium succinate.

Next, the compressive strength by uniaxial test on the same test specimen was 9 kg/cm$^2$. Therefore, the resulting resin can be used for the quite same purpose as a soil stabilizing agent just like the liquid phenol formaldehyde resin as described in Example 1.

EXAMPLE 3

When 10 percent by weight of γ-butyrolactone as a hardening agent was added in the strong alkaline liquid urea modified phenol formaldehyde resin and then left at room temperature, it gelled after 5 minutes. The test specimen (40 × 80 mm) obtained by grouting standard grain sands showed a compressive strength by uniaxial test of 200 kg/cm$^2$, after aging it for one week under water.

Which various embodiments of the invention have been disclosed herein, they are to be considered as illustrative, and not limiting the invention.

What is claimed is:

1. In the method of soil stabilization and leakage prevention comprising introducing into the formation to be treated a composition comprising a water soluble strongly alkaline liquid phenol-formaldehyde resin having a pH of at least 9.5 and having a molar ratio of phenol to formaldehyde between 1:1.5 and 1:3.0, and a lactone which is employed in a proportion of 1 to 30 percent of the liquid resin, the improvement comprising incorporating in said composition a gelation time control agent selected from the group consisting of urea, urea derivatives, acetonitrile, water soluble basic salts and water soluble neutral salts.

2. The method of claim 1 wherein sodium acetate is employed in said composition as a gelation accelerator.

3. The method of claim 1 wherein urea is employed in said composition as a gelation retarder.

4. The method of claim 1 wherein a part of the phenol in the phenol-formaldehyde resin is replaced by a compound selected from the group consisting of urea, melamine, dicyandiamide, lignin, cresols, catechol, resorcinol, and guanamines.

5. The method of claim 4 wherein the replacement compound is urea.

6. The method of claim 5 wherein sodium succinate is employed in said composition as a gelation accelerator.

* * * * *

PO-1050
(5/69)

UNITED STATES PATENT OFFICE
CERTIFICATE OF CORRECTION

Patent No. 3,696,622　　　　　　　　Dated　October 10, 1972

Inventor(s)　　　　Wataru Tohma et al.

It is certified that error appears in the above-identified patent and that said Letters Patent are hereby corrected as shown below:

Column 5, line 58, "1.95-1.96" should read --1.195-1.196--.

Signed and sealed this 4th day of June 1974.

(SEAL)
Attest:

EDWARD M. FLETCHER, JR.　　　　　　C. MARSHALL DANN
Attesting Officer　　　　　　　　　Commissioner of Patents